(12) United States Patent
Brown Elliott

(10) Patent No.: US 9,118,890 B2
(45) Date of Patent: Aug. 25, 2015

(54) 3D DISPLAY

(71) Applicant: Samsung Display Co., Ltd., Yongin, Gyeonggi-Do (KR)

(72) Inventor: Candice Hellen Brown Elliott, Santa Rosa, CA (US)

(73) Assignee: Samsung Display Co., Ltd. (KR)

( * ) Notice: Subject to any disclaimer, the term of this patent is extended or adjusted under 35 U.S.C. 154(b) by 484 days.

(21) Appl. No.: 13/673,737

(22) Filed: Nov. 9, 2012

(65) Prior Publication Data
US 2014/0132711 A1  May 15, 2014

(51) Int. Cl.
*H04N 13/04* (2006.01)
*H04N 13/00* (2006.01)

(52) U.S. Cl.
CPC ....... *H04N 13/0007* (2013.01); *H04N 13/0413* (2013.01); *H04N 13/0422* (2013.01); *H04N 13/0438* (2013.01); *H04N 13/0454* (2013.01); H04N 13/0404 (2013.01); H04N 13/0456 (2013.01)

(58) Field of Classification Search
CPC ............. H04N 13/00; H04N 13/0438; H04N 13/0452; H04N 13/0454; H04N 13/0456
See application file for complete search history.

(56) References Cited

U.S. PATENT DOCUMENTS

2004/0263968 A1* 12/2004 Kobayashi et al. ............ 359/462
2011/0122235 A1*  5/2011 Lee et al. ......................... 348/51

* cited by examiner

*Primary Examiner* — Huy T Nguyen
(74) *Attorney, Agent, or Firm* — Innovation Counsel LLP

(57) ABSTRACT

A method for displaying images in three dimensions is provided in which input image data which includes left eye image data and right eye image data offset to provide stereopsis is used to calculate a common image and a left and right residual image. The common image includes information that is common to both the right eye image and the left eye image. The left and right residual images include information from, respectively, the left eye image and the right eye image that creates depth perception. The common, left residual and right residual images are displayed in a sequence.

21 Claims, 12 Drawing Sheets 31  32

3D DISPLAY

BRIEF DESCRIPTION

Embodiments of the present invention relate generally to display systems. More specifically, embodiments of the present invention relate to methods and systems for 3D displays.

BACKGROUND

Creating a 3D experience, or the illusion of depth, for a viewer from a two dimensional display panel typically involves displaying a pair of two dimensional images that are slightly offset from each other. The two offset images represent two perspectives of the same scene or object, with deviations that match the perspectives that each eye sees with binocular vision. One of the two images is presented to the viewer's left eye and the other to the viewer's right eye. The viewer's brain then combines these images to perceive depth (known as stereopsis).

There are a variety of different methods for providing the separate images to each eye. In, for example, the time-sequential method using shutter glasses, the display screen alternately displays the left eye and right eye images in a determined time period, such as every other frame. The viewer wears glasses that alternately transmit light to the left eye and the right eye in synchronization with the display screen. The glasses, referred to as shutter glasses or active glasses, block the right eye view when the left eye image is displayed on the display screen, and then block the left eye view when the right eye image is displayed on the display screen. FIG. 1 illustrates a time sequence display of an image using shutter glasses 10 for creating stereopsis. In the first step 11, the left eye image 13 is seen by the left eye through the opening in the shutter glasses 10 and the right eye view 15 is blocked. In the second step 12, the left eye view of the right eye image 16 is blocked while the right eye views the right eye image 16 through the shutter glasses 10. When such a sequence is performed fast enough, typically at a rate of 60 Hz or more, the viewer does not perceive the switching between the two images, but instead the viewer's brain integrates the two offset images into a single, 3D image.

In other methods, referred to as auto-stereoscopic, the viewer is not required to wear glasses. For instance, in the parallax barrier method, as illustrated in FIG. 2, the image for the left eye 21 and the image for the right eye 22 are interleaved for each frame. The display panel includes a parallax barrier 23 having a series of slits 24 positioned so that the right eye image is directed toward and viewed only by the right eye 26, and the left eye image is directed toward and viewed only by the left eye 28. The slits are small enough that they are not perceived by the viewer, and instead, the viewer's brain integrates the images received into the left and right eyes of the viewer into a single, 3D image.

SUMMARY

A method for displaying images in three dimensions on a display system is provided that includes receiving into the display system right eye image data and left eye image data for each pixel of the image; calculating a common image from the right eye image data and left eye image data, the common image including image information that is common to both the right eye image and the left eye image; calculating a left residual image from the common image and the left eye image data, the left residual image including image information from the left eye image data that creates depth perception; calculating a right residual image from the common image and the right eye image data, the right residual image including image information from the right eye image data that creates depth perception; and sequentially displaying the common image, the right residual image and the left residual image on the display system in a predetermined sequence. Calculating the common image from the right eye image data and the left eye image data may include, for each pixel, determining a minimum value between the right eye image data and the left eye image data. Calculating the left residual image may include, for each pixel, subtracting the left eye image data from the common image. Calculating the right residual image may include, for each pixel, subtracting the right eye image data from the common image. The predetermined sequence may be the common image, followed by the right residual image, followed by the common image, followed by the left residual image.

The display system may include a display panel connected to a data processing module, the right eye image data and left eye image data is received into the data processing module, the data processing module calculates the common image, the left residual image and the right residual image and the display panel displays the common image, the left residual image and the right residual image.

The display system may include shutter glasses, and the method may further include synchronizing a state of the shutter glasses with the predetermined sequence. The state of the shutter glasses allows both eyes of a viewer to see through the glasses when the common image is displayed, the state of the shutter glasses allows a left eye of a viewer, but not a right eye of the viewer, to see through the glasses when the left residual view is displayed, and the state of the shutter glasses allows a right eye of a viewer, but not a left eye of the viewer, to see through the glasses when the right residual image is displayed.

The display system may include a backlight including an array of individually controllable multi-color light emitters and a display panel that spatially modulates light from the backlight, where calculating the left residual image includes calculating a separate left residual image for each color of multi-color light emitters in the backlight; calculating the right residual image includes calculating a separate right residual image for each color of multi-color light emitters in the backlight; and the predetermined sequence includes displaying the common image with all colors in the backlight and alternately displaying the right residual image and left residual image for different colors in the backlight.

The display panel may include a parallax barrier, and the method may further include creating an interleaved image by interleaving the left residual image and right residual image and synchronizing a state of the parallax barrier with the predetermined sequence, where the predetermined sequence includes displaying the left residual image and right residual image as the interleaved image. The state of the parallax barrier is off when the common image is displayed and the state of the parallax barrier is on when the interleaved image is displayed. A prefilter may be applied to the left eye image data and right eye image data to reduce a resolution difference between the common image and the interleaved image.

The display panel may include a parallax barrier, and the method may further include calculating an odd interleaved image by interleaving the left residual image and right residual image with a first portion of the left residual image in a first position of the odd interleaved image; calculating an even interleaved image by interleaving the left residual image and right residual image with a first portion of the right residual image in a first position of the even interleaved image; and synchronizing a state of the parallax barrier with the predetermined sequence; where the predetermined sequence includes displaying the left residual image and right residual image as the odd interleaved image and the even interleaved image The display system may include a display panel and a directional backlight, and the method may further include synchronizing a direction the directional backlight directs light through the display panel with the predetermined sequence, wherein the backlight directs light to both eyes of a viewer when the common image is displayed, the backlight directs light to a left eye of the viewer when the left residual image is displayed, and the backlight directs light to a right eye of the viewer when the right residual image is displayed.

DETAILED DESCRIPTION

Figure 1:
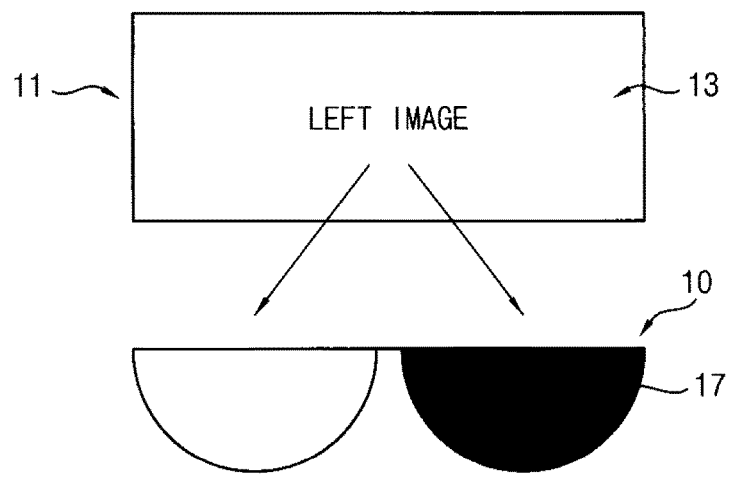
FIG. 1 illustrates a time-sequential method for 3D display.
Figure 1:
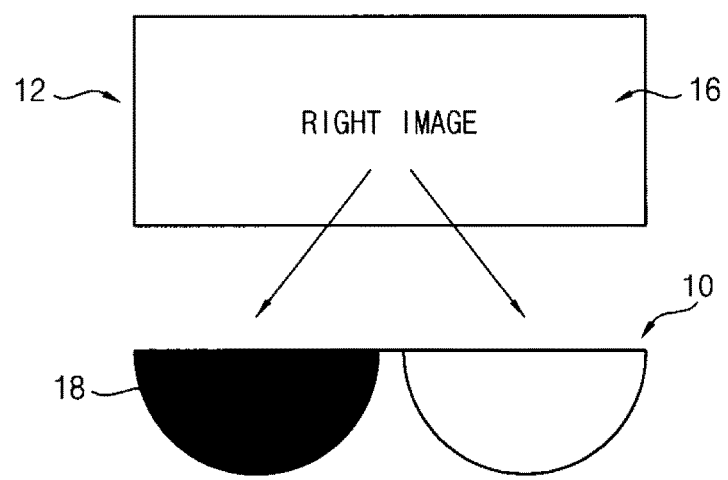
Figure 2:
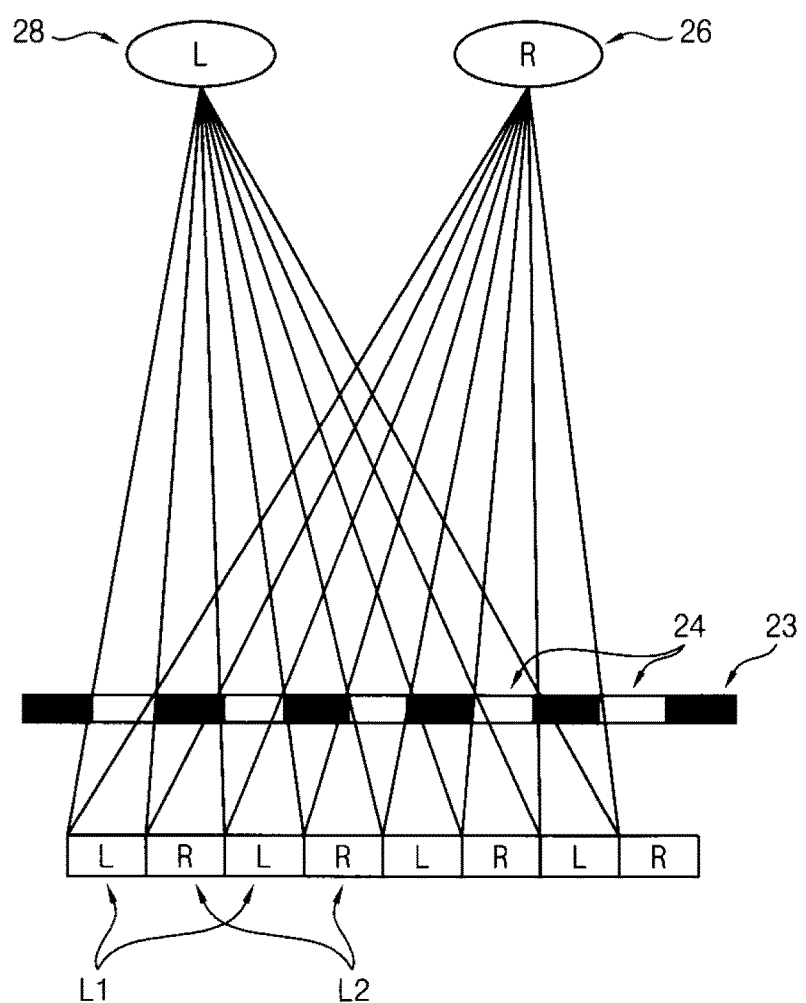
FIG. 2 illustrates a parallax barrier method for 3D display.

In the time sequence method for creating stereopsis illustrated in FIG. 1, the shutter glasses alternately block the view of one of the two eyes. Because of the blocked right eye view 17 and the blocked left eye view 18, half of the light produced by the display is blocked at any one time, so that the viewer only sees half the light, and the brightness of the display is diminished. Stated another way, the energy displayed is half of what it would be in a regular 2D view. Such energy loss also occurs in a parallax barrier method. Viewing FIG. 2, the parallax barrier 23 blocks half of the light from each frame going to the viewer. That is, the portion of the light from the right eye view that is directed to the left eye is blocked and the portion of the light from the left eye view that is directed to the right eye is also blocked, resulting in approximately half of the light (i.e. half of the energy) being lost.

Figure 3:
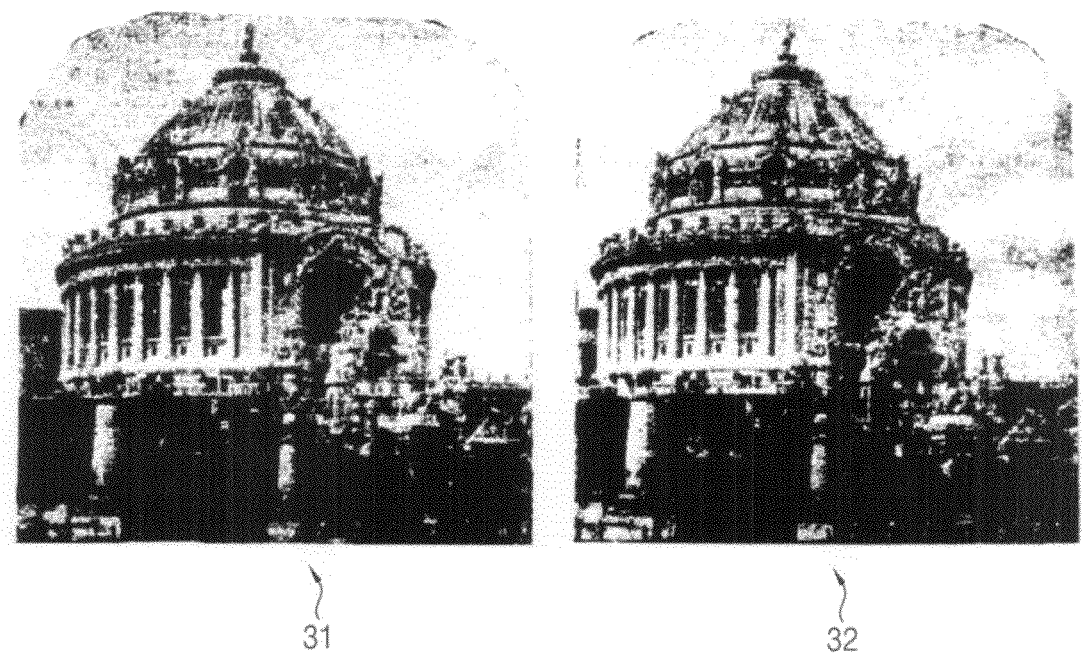
FIG. 3 a typical left eye image and right eye image that are offset from each other.

FIG. 3 shows a typical left eye image 31 and right eye image 32 that are offset from each other and that would be displayed using a 3D display method to form the stereoscopic image. The left eye image 31 and the right eye image 32, although offset to create stereopsis, are actually very similar. In fact, for the majority of images viewed in 3D, such as images for movies, the left eye image and the right eye image are very similar, typically 95% identical or more. The embodiments disclosed herein take advantage of the similarity in right eye and left eye images to increase the brightness of 3D displays, and thus decrease the power required to display the images.

In example embodiments, the data for the two offset images (the left eye image data and right eye image data) for a single image (for instance, for a single frame of a movie) are used to form a common image, a left residual image, and a right residual image for that image. The common image contains the portions of the two offset images that are the same. That is, the common image includes information that is the same in both the left eye image and the right eye image. The left residual image and right residual image have, respectively, just the information from the left eye image (for the left residual image) and the right eye image (for the right residual image) that creates the depth perception. That is, the residual images include the portion of the right and left eye images that have the offset information that creates the perception of depth. The three resulting images—common, right residual, and left residual—are then used with a 3D display system to display the image in 3D to the viewer, as will be described below.

An example embodiment for creating the common, right residual, and left residual images is shown in the following Table 1.

TABLE 1

| Common = Min (L, R) | (S100) |
| Right Residual = Right Image − Min (L, R) | (S200) |
| Left Residual = Left Image − Min (L, R) | (S300) |

Starting with the left eye image and the right eye image, the common image is created (S 100) by determining, for each pixel, a minimum value between the left eye image and the right eye image. That is, the minimum value of an overlay of the right and left images. For instance, if the image data is R, G, B data, the common image is created by determining the minimum R, G, and B values for each pixel between the left eye image data and the right eye image data. The right residual image is created (S200) by subtracting, for each pixel, the common image created in S100 from the right eye image, and a left residual image is created (S300) by subtracting, for each pixel, the common image created in S100 from the left eye image. For instance, if the image data is R, G, B data, the residual images are created by, for each pixel, subtracting the R, G, B data for the common image from, respectively, the image data for the left eye and right eye images.

Figure 4:
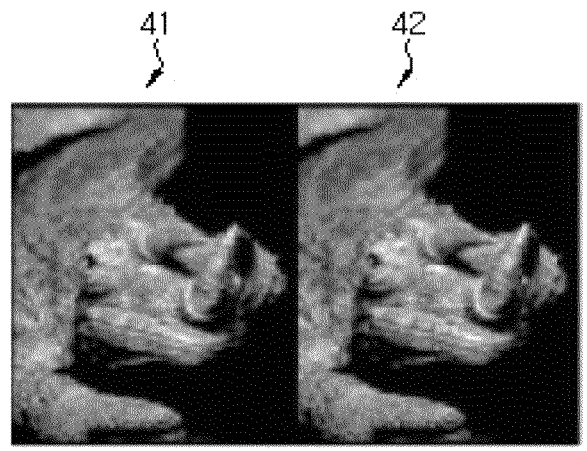
FIG. 4 illustrates offset left eye and right eye images and resulting common, left residual and right residual images of an example embodiment.
Figure 4:
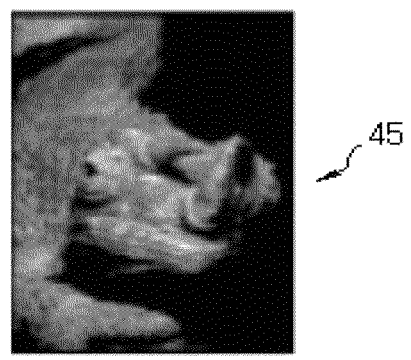
Figure 4:
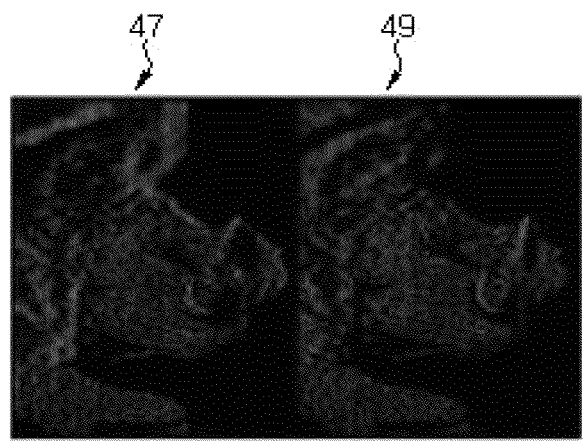

The result of the process of Table 1 are illustrated in FIG. 4, which illustrates a left eye image (41) and right eye image (42) for a frame which are standard stereoscopic images that are the starting point for creating the three resulting images. The common image (45), a left residual image (47) and a right residual image (49) that are created using the method outlined in Table 1 are also illustrated. As can be seen in FIG. 3, between the common image (45), right residual image (47) and left residual image (49), the majority of the energy for the frame is stored in the common image.

Another example embodiment for creating the common, left residual and right residual images is shown in Table 2.

TABLE 2

| Common = Min (L, R) − X | (S102) |
| where 0 ≤ X ≤ Min (L, R) | |
| Right Residual = Right Image − Common | (S202) |
| Left Residual = Left Image − Common | (S302) |

In the equation S102 in the above Table 2, X can be derived from any function. The process in Table 2 may, for example, be used with an adjustable backlight, and X is set to a value, for instance a maximum value of the common image (within the above ranges), which value is also used to set the backlight. This moves more energy out of the common image and into the residual images to create three views with more equal energy, and therefore helps to reduce flicker.

The common, left residual and right residual images are then used in a 3D display system to create the three dimensional image perceived by the viewer. The manner in which the three images are displayed to create the 3D image depends upon the method used by the 3D display system.

Time-Sequential Display Systems Using Glasses

Figure 5:
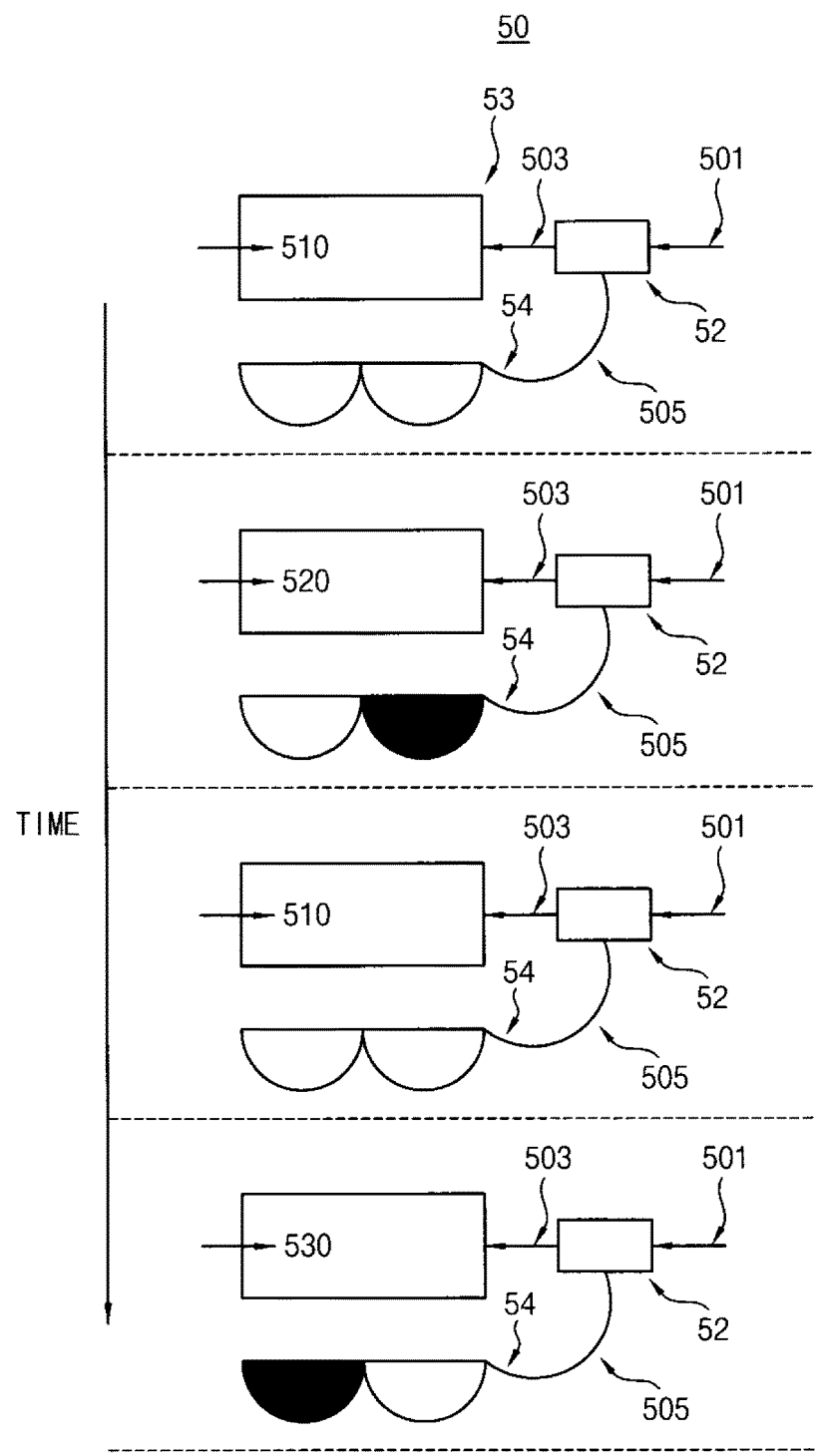
FIG. 5 illustrates a 3D display system that uses shutter glasses for use with the method of the embodiments.

In an example embodiment, the 3D display system utilizes shutter glasses in a time-sequential display method. FIG. 5 illustrates a 3D display system that uses shutter glasses for use with the method, and a display sequence for the images along with the corresponding state of the glasses, which are synchronized with the display. Display system 50 includes data processing module 52, display panel 53 and shutter glasses 54. Display panel 53 may be any display panel capable of displaying image data including, for example, a liquid crystal display or an OLED (organic light emitting display). Image data 501, for example RGB image data, is input into the data processing module 52. The input image data 501 for 3D images will include data for a left eye image and data for a right eye image. The data processing module 52 then performs the operations necessary to create the common, left residual and right residual images from the input image data 501, for instance, by performing the operations outlined in Table 1. Data processing module 52 may also perform a variety of other data operations as are known in the art and required to display the image based on the type of display system. For instance, subpixel rendering and local dimming backlight adjustments may be performed by data processing module 52 (See, for example, U.S. Patent Application Publication Number 2007/0279372 "Multiprimary Color Display with Dynamic Gamut Mapping," 2009/0174638 "High Dynamic Contrast Display System Having Multiple Segmented Backlight," and 2010/0118045 "Subpixel Layouts and Subpixel Rendering Methods for Directional Displays and Systems") The data processing module 52 then outputs the display signals 503 for the common, left residual and right residual images to the display panel 53 in a predetermined sequence, as will be discussed below, so that the display panel 53 displays the images. The data processing module 52 also provides the shutter glasses 54 with an operation signal 505 that is synchronized with the display signal 503 and depends on the image provided to the display panel. For example, when a common image 510 is displayed on display panel 53, the glasses 54 have both sides "open" and thus simultaneously allow the light to reach both the left and right eyes of the viewer. When the left residual image 520 is displayed on display panel 53, the glasses 54 are set to block the right eye view. When common image 510 is then again displayed, the glasses 54 are again set to allow light to reach both the left and right eyes. When the right residual image 530 is displayed, the glasses 54 are set to block the left eye view.

As with other 3D displays, because the viewer's brain integrates the views, if the frequency at which the sequence of views are displayed is fast enough, a three dimensional image is perceived by a viewer when the three images—common, left residual, and right residual—are shown in sequence. Thus, refresh rates of, for example, 48 Hz or more are adequate to provide the perception of 3D in the viewer. Additionally, in such a sequence, the common view, which contains most of the energy, is seen by both eyes and may, depending on the predetermined sequence, be seen twice as often as the residual images, and therefore the three dimensional image seen by the viewer is brighter.

The display sequence used to display the three images may be common-left residual-common-right residual, as shown in FIG. 5, but could also be, for example the alternate, common-right residual-common-left residual, or, for example, common-left residual-right residual-common-right residual-left residual. Various other display sequences may be employed.

Display systems capable of performing such a display method using the three images include, for example, an LCD display panel for display panel 53 with a computer processor for the data processing module 52. Shutter glasses and systems employing shutter glasses are commercially available.

In an example embodiment, the 3D display system utilizes a field sequential color display method with a backlight array of individually controllable multi-color light emitters and a display panel that spatially modulates the light from the backlight using a set of individually controllable transmissive elements, for example, as described in U.S. Patent Application No. 2009/0174638, (the '638 Application) incorporated by reference herein in its entirety.

In a 2D display system that uses a field sequential color display, the 2D image is divided into separate images for each different color pixel in the display system. For instance, in an RGB color display, the 2D image is divided into a red image, a green image, and a blue image. The individual color images are then displayed in sequence. When the sequence of individual color images is displayed with high enough frequency, the viewer only perceives a single image. The individual color images need to be displayed sequentially with a frequency of at least 60 Hz, which is typically doubled to allow the LCD to respond. Thus 60 Hz×3 colors×2 (to allow for LCD response) is equal to 360 Hz. To use such a field sequential color display method with a conventional 3D display method, such as illustrated in FIG. 1, in which two offset images are displayed, the required refresh rate is 720 Hz (360 Hz×2 offset images). 720 Hz is much larger than the 480 Hz refresh rate used in current systems. On a system with a 480 Hz refresh rate, displaying the three colors, and two offset images (with the response rate doubling) would only allow the images to be displayed at 40 Hz (480 Hz/(3×2×2)). Because 40 Hz is below the fusion frequency of 48 Hz at which human perception integrates the sequentially displayed images, the display would suffer from a noticeable flicker. That is, the images would not be displayed fast enough so that the viewer's brain would integrate the 6 images into one, and instead the viewer would perceive the changes in the separate images. Thus, because displays having the required refresh rate to display 3D images using two offset images on a field sequential system are not available, a limitation of field sequential color displays has been that they cannot display standard time-sequential 3D. In the embodiments herein, however, which use the common, left residual and right residual images, field sequential color display systems can be used to display 3D images.

In an example embodiment for displaying 3D images on field sequential color displays, the offset image data (i.e., the left eye image data and right eye image data) are used to create a common image with all colors (using the methods as described above), and then also left residual and right residuals image may be created for each color. The images could then be displayed on a display system with field sequential color display capabilities, in an RGB color display for example, as follows:

C-$R_{LR}$-$G_{RR}$-$B_{LR}$-C-$R_{RR}$-$G_{LR}$-$B_{RR}$-C . . . etc. sequence A Where "C" is the common view having all three colors and the majority of the light energy. "R," "G" and "B" represent the red, green and blue field sequential colors, and LR and RR are left and right residuals. So, for instance "$R_{LR}$" is the red color left residual image. The sequence A would also include, for instance, a black field only view between each of the views listed, to accommodate the LCD response time. The sequence A would be synchronized with shutter glasses as described above with respect to FIG. 5, with the shutter glasses allowing the viewer to see through both the left and right side when the common image is displayed, and only the appropriate eye when one of the left or right residual image is displayed. A display sequence using the common, left and right residual view, such as sequence A, provides the advantages of using a field sequential color display while also allowing 3D to be displayed. Additionally, the brightness of the 3D is enhanced because the majority of the energy is in the common image. Various other sequences could be employed, and field sequential color displays are not limited to red, green and blue but may use other color schemes.

Figure 6:
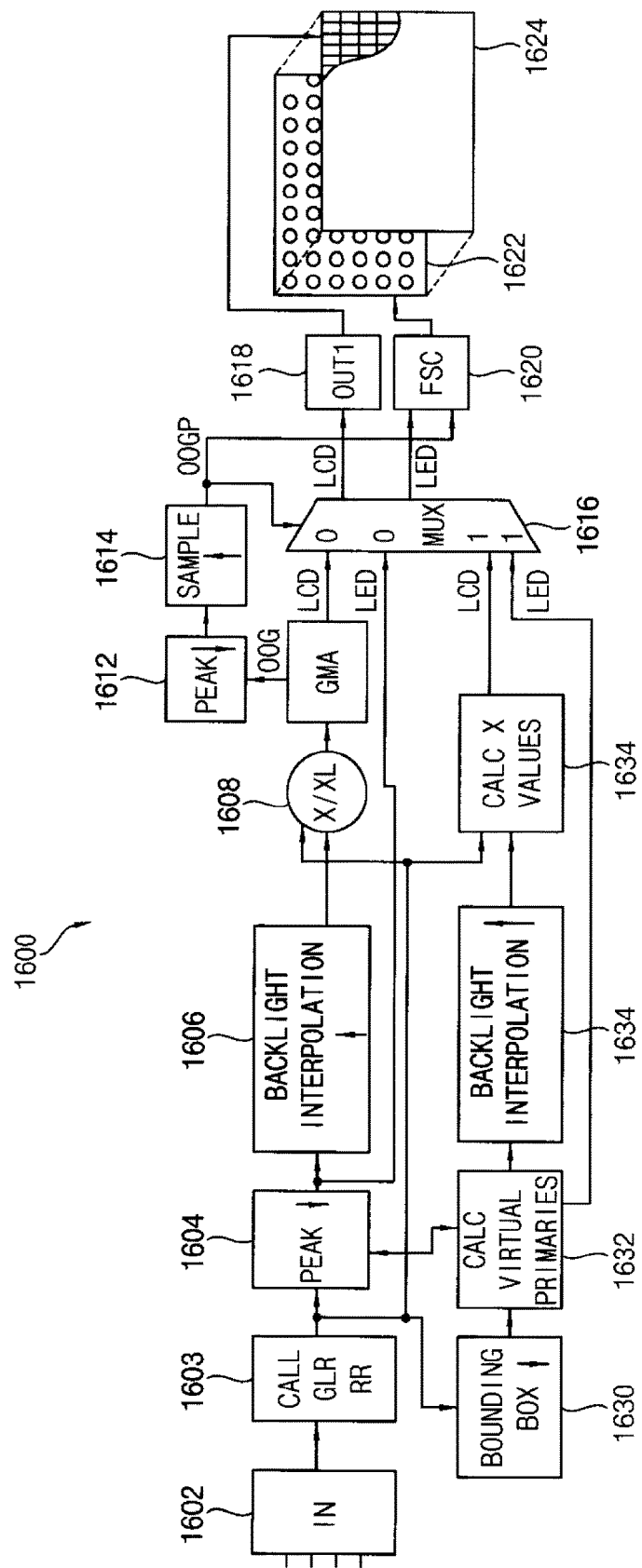
FIG. 6 illustrates a display system that uses a field sequential color display for use with the method of the embodiments.

An example embodiment of a display system that uses a field sequential color display method with a backlight array of individually controllable multi-color light emitters and a display panel that spatially modulates the light from the backlight using a set of individually controllable transmissive elements that can be used with the 3D display method disclosed herein is illustrated in FIG. 6 (and is based on the system described in FIG. 18 of the '638 Application). In FIG. 6, display system 1600 includes an LCD display panel 1624 with individually controllable transmissive elements and a backlight array 1622 with individually controllable multi-color light emitters. Image data for the left and right offset images is input into input gamma unit 1602. From there the data proceeds to the CALC C, LR, RR unit 1603 where the common (C), left residual (LR), and right residual (RR) images for each pixel are calculated from the input image data as described above. From there the image data may proceed along two data paths as described more fully in the '638 application. For example, data may proceed along peak unit 1604, interpolation unit 1606, X/$X_L$ unit 1608, GMA 1610, OOG peak unit 1612 to an up-sample unit 1614. From there, depending on the signal OOGP supplied to Mux 1616, one of two data paths could be selected to drive backlight 1622 and LCD 1624 via output gamma unit 1618 and a Field Sequential Color control unit 1620. The second data path may include inputting data from the CALC C, LR, RR unit 1603 to a bounding box unit 1630, a Calc virtual primaries module 1632, a backlight interpolation module 1634, and Calc. $\chi$ Value module 1840 to produce values to be run through output gamma module 1618 to convert them to the output quantization values available on the display. The $\chi$ output values may be put in the LCD display 1624 while the virtual primaries are displayed sequentially in the LED backlight by the FSC module 1620.

The CALC C, LR, RR unit 1603 may calculate the common (C), left residual (LR), and right residual (RR) images and the display system 1600 may use such images to display the images using the methods described herein in conjunction with the methods described in the '638 Application as follows:

A. To determine the Common image:
   1) Determine the common "over average" backlight by surveying the pixels within each zone of both offset views using the recursive algorithm as described in the '638 Application.

2) Find the RBG Min(L,R) image by comparing the left and right offset images, pixel by pixel, in each of the R, G and B values, taking the smallest value of each color in unit 1603.
   3) Convert the RGB Min(L,R) image to the display color space (RGBW or RGBCW) using the backlight normalized X/XL GMA.
   4) Create a OOG normalization image of the backlight normalized GMA image by finding the ratio MAXCOL/MAX(RGBCW) and clipping to one (1=MAXCOL).
   5) OOG normalize the RGB Min(L,R) by multiplying it with the OOG normalization image.
   6) OOG normalize the backlight normalized GMA image by multiplying it with the OOG normalization image. The result is the common (C) image.

B. To determine the residual images:
   1) Subtract the OOG normalized RGB Min (L,R) from the left and right offset images.
   2) Independently process the left residual and right residual images to create the FSC fields for each view.

Autostereoscopic Systems

The 3D display method disclosed herein may also be used with autostereoscopic 3D display systems, provided such systems have the capability of switching between a 3D display mode, which is used to display the left and right residual images, and a 2D display mode, which is used to display the common view. Thus, a display sequence for such systems may be, for example, 2D+C-3D+LR/RR-2D+C-3D+RR/LR, where 2D+C is the common image displayed with the display system in the 2D display mode, 3D+LR/RR is the left and right residual images displayed with the display system in the 3D display mode, and 3D+RR/LR is also the left and right residual images displayed with the display system in the 3D display mode, but, if possible in the particular display system, with the left and right residual images displayed in alternate orientations. In such systems, the 3D display mode provides reduced light as compared to the 2D mode (as described above), thus the light provided, for instance from the backlight and/or LCD panel values, needs to be adjusted accordingly to compensate for the variation in light provided to the viewer so that the display does not flicker. Display systems that can switch between 2D and 3D display modes are described in, for example U.S. Pat. No. 8,144,390 "Apparatus and Method for 2D and 3D Image Switchable Display" and U.S. Pat. No. 8,054,329 "High Resolution 2D-3D switchable Autostereoscopic Display Apparatus" incorporated herein by reference in their entirety. The use of the 3D display method disclosed herein with two autostereoscopic 2D/3D switchable systems—a parallax barrier system and a directional backlight system—are described below.

Parallax Barrier Display Systems

In an example embodiment, a parallax barrier type autostereoscopic display system may be used with the 3D display method. In the parallax barrier system of the type illustrated in FIG. 2, the parallax barrier 23 stays in place, while the interleaved left eye and right eye images change frame-by-frame. To use such a parallax system with the 3D display method herein, however, when the common image is viewed, the parallax barriers are removed from the display. Thus, a parallax barrier 3D display system useful with the display method will be able to switch the parallax barrier between an on state and an off state.

Figure 7:
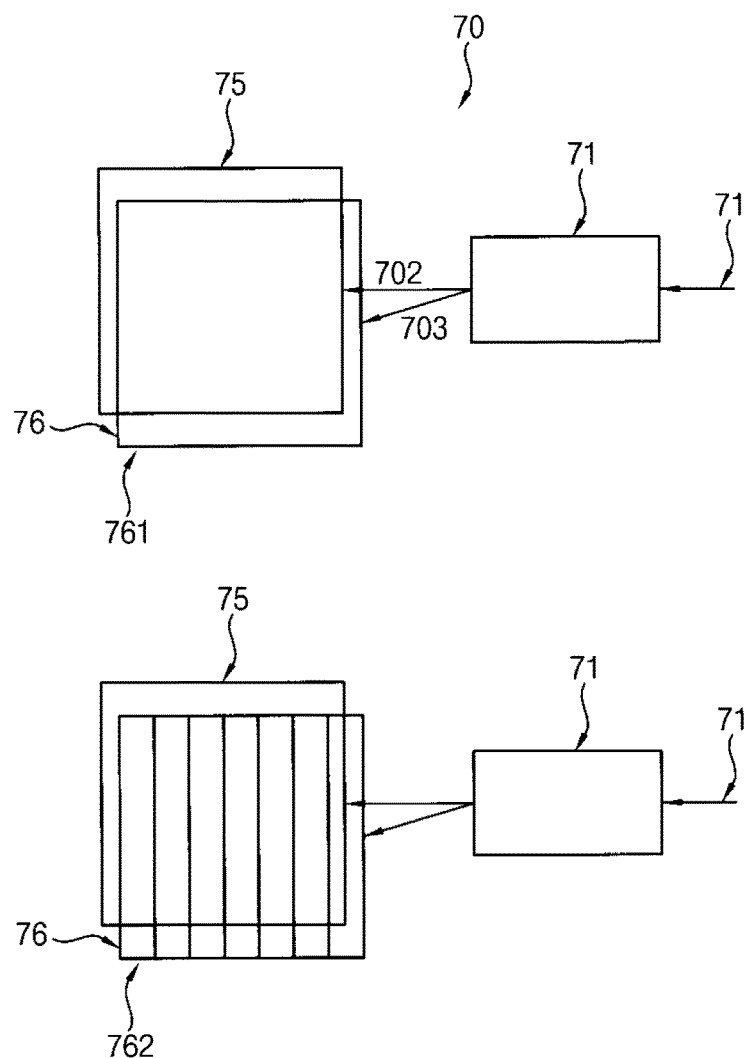
FIG. 7 illustrates a display system for displaying 3D images using a parallax barrier for use with the method of the embodiments.

FIG. 7 illustrates a display system 70 for displaying 3D images using a parallax barrier that can be switched between a 2D mode (i.e., the parallax barriers are off) and a 3D mode (i.e., with the parallax barriers on). The input image data 71, which includes data for the 2 offset images for displaying in 3D (the left eye image data and the right eye image data), is input into data processing module 72. Data processing module 72 produces, from the two offset images included in the input data, the common and left and right residual images using the methods described above. The data processing module 72 also produces an interleaved image of by interleaving the left and right residual images. The display system 70 includes display panel 75, which may be, for example, a liquid crystal display or a light emitting diode display, and a parallax barrier 76 which can be turned on and off. The parallax barrier 76 is typically positioned over the display panel 75. FIG. 7 illustrates display system 70 with the parallax barrier in the off state 761 and in the on state 762. When the common image is displayed, the parallax barrier is off (i.e., the 2D mode). When the interleaved left and right residual images are displayed, the parallax barrier is on. Thus, the sequence may, for example, be as follows:

Image: common-interleaved left residual/right residual
Barrier: off state-on state After converting the input data for the 2 offset images to the common image and interleaved left and right residual images, the data processing module 72 outputs the signal 702 including the common image to display panel 75 and the signal 703 putting the parallax barrier 76 into the off state 761 for display of the common image in 2D. Then the data processing module 72 outputs the signal 706 including the interleaved left and right residual images to the display panel 75 and the signal 707 putting the parallax barrier 76 into the on state 762 for display of the interleaved images in 3D mode. The data processing module may include other functions, such as sub-pixel rendering and backlight controls, as are known in the art, used for displaying the images on the display panel 75 depending on the requirements of the display system 70.

Such a display system must account for two differences between the 2D display mode, in which the common image is displayed with the parallax barrier off, and the 3D display mode, in which the interleaved left and right residual images are displayed and the parallax barrier is on. First, the parallax barrier, because it blocks the light, cuts the transmissivity of the display panel, so that the interleaved images are not as bright as the common image. Secondly, the horizontal resolution is reduced in when the left and right residual images are interleaved, so that the resolution in the 3D mode is less than that of the 2D mode.

Use of the parallax barrier blocks a portion of the light from the display, and can reduce the transmissivity by a half or more. Thus, the change in transmissivity between the common image view and the interleaved residual image view needs to be accommodated with the display system. This can be accomplished, for example, by increasing the backlight power when the interleaved image is displayed, using backlight dimming methods as are known in the art. In such a method, the amount of light provided from the source light for the display is increased in proportion to the amount of light lost as a result of the parallax barrier when the parallax barrier is in the on state as compared to when the parallax barrier is in the off state, to balance the brightness between the common, 2D and interleaved, 3D (with parallax barrier on) images.

Secondly, with respect to the reduced resolution when the parallax barrier is on, the image data may be filtered to account for the difference in resolution. For example, in the case of an RBG stripe panel that has parallax barriers that are one pixel wide, i.e., the barrier is one row wide or three subpixel columns wide. Because of the possibility of cross-talk between the common and interleaved images, the full resolution (common, 2D) image must be filtered horizontally to the lower resolution of the interleaved, 3D image. To not lose resolution, in one embodiment, the images are prefiltered using an adaptive filter. The filter may remove high special frequencies that are not the same in the two views, but leave them unfiltered in areas of the image where they are the same in the two images. For example, a simple filter that performs such a task may be a tent filter (1, 2, 1) and a unity filter (0, 4, 0). The adaptive test may be performed using a high special frequency measuring filter and a unity filter: 1, 2, −1 and 0, 4, 0 which may be applied to each pixel as shown in the following Table 2:

TABLE 2

| If Right(RGB) ≈ Left (RGB) and | (S120) |
| If Right (−1, 2, −1) ≈ Left (−1, 2, −1) then Unity | (S220) |
| Else Tent Filter | (S320) |

In Table 2, "Right(RGB)" is a pixel in the right offset input image data and "Left(RGB)" is the corresponding pixel in the left offset image input data. For each pixel, the input image data are compared (S120). If the data are approximately similar, for instance within a given tolerance, then the next step S220 is performed, otherwise a tent filter is applied (S320). The input image data are also compared (S220) to see if, for the horizontal array Right(−1, 2, −1) is approximately Left(−1, 2, −1). If both S120 and S220 are met, then a unity filter is applied. Table 3 outlines pseudocode (in Lua) that may be used to apply the pre-filter as described in Table 1

TABLE 3

These are routines that are called for every pixel: The input image (pipeline) is split into two halves, so fetching from (x,y) is the left and (x+xhaf,y) is the right side. The rest of the descriptor is handling the SPR, gamma, etc . . .
function dospatial(x,y)
--adaptive horizontal spatial filtering
locallur,lug,lub=spr.fetch(pipeline,x ,y)
local rur ,rug,rub=spr. fetch(pipeline,x+xhaf,y)
local
ltr,ltg,ltb=spr.sample(pipeline,x ,y ,O,hsharp ),spr.sample(pipeline,x ,y,l , hsharp ) , spr.sample(pipeline,x ,y,2,hsharp)
local
rtr ,rtg,rtb=spr.sample(pipeline,x+xhaf,y ,O,hsharp ),spr .sample (pipeline,x+xhaf,y, 1 ,hsharp), spr.sample(pipeline,x+xhaf,y ,2,hsharp)
if near(lur,lug,lub,rur,rug,rub )<pthresh and near(ltr,ltg,ltb,rtr,rtg,rtb )
<fthresh then spr.store(spat,x ,y,lur,lug,lub)
--write the unity filtered values
spr. store( spat,x+xhaf,y ,rur ,rug,rub )
else .

TABLE 3-continued

```
ltr,ltg,ltb=spr.sample(pipeline,x ,y,O,htent),spr.sample(pipeline,x ,y,l ,htent),
spr.sample(pipeline,x ,y,2,htent)
rtr ,rtg,rtb=spr .sample(pipeline,x+xhaf,y ,O,htent ),spr .sample(pipeline,
x+xhaf,y, 1 ,htent ), spr .sample(pipeline,x+xhaf,y,2,htent)
spr.store(spat,x ,y,ltr,ltg,ltb)
--write the tent filtered values
spr .store( spat,x+xhaf,y ,rtr ,rtg,rtb )
end
end
function doresid(x,y)
--calculate minimum and residual values
local rl,gl,bl=spr.fetch(pipeline,x,y)
local rr ,gr, br=spr .fetch(pipeline,x+xhaf,y)
local minr,ming,minb=spr.fetch("minb",x,y)
local rrl,grl,brl=rl-minr,gl-ming,bl-minb --left residuals
local rrr,grr,brr=rr-minr,gr-ming,br-minb --right residuals
spr.store("resid" ,x,y,rrl,grl,brl)
spr.store("resid" ,x+xhaf,y,rrr,grr,brr)
end
minscale=minscale or 1.0
function domin(x,y)
--calculate minimum alone
local rl,gl, bl=spr .fetch(pi peline,x,y)
local rr ,gr, br=spr .fetch(pipeline,x+xhaf,y)
local minr ,ming,minb=math.min(rl,rr ),math.min(gl,gr ),math.min(bl,br)
minr,ming,minb=minr*minscale,ming*minscale,minb*minscale
spr.store("mina",x,y,minr,ming,minb)
end
```

Once the filtering is performed, for instance in data processing module 72 of FIG. 7, the common and left and right residual images can then be calculated, and then the left and right residual images interleaved, as described above. The images then may be displayed in the sequence described above.

When, instead of RGB, other subpixel arrangements are used, for example, a PenTile RGBW(L6W) panel that has parallax barriers that are one pixel wide (i.e., one row wide, or two subpixel columns wide), additional processing is performed in data processing module 72. With such pixel arrangements, the RGB image data needs to be converted from RGB to RGBW and SPR (subpixel rendering) on the L6W layout needs to be performed. For the common image, which is displayed in 2D mode with the parallax barriers turned off, the SPR is identical to the methods used for regular 2D displays, which are known to those of skill in the art. For the 3D mode, however, the SPR uses a one dimensional tent filter and metamer sharpening in the direction parallel to the parallax barriers: 1,2,1 and −1, 2, −1, which is applied before the images are interleaved. In the case of PenTile RGBW, the R and B subpixels all sample as though collocated with the G subpixels. Thus, in the case where the parallax barrier orientation is aligned with the RGBW rows, the R to the left and the B to the right sample as though they were collocated with the G. However, in the case with parallax barriers perpendicular to the RGBW row, the B is on the next row, below the R, but is still resampled as though collocated with the G to the right of the R above.

Figure 8A:
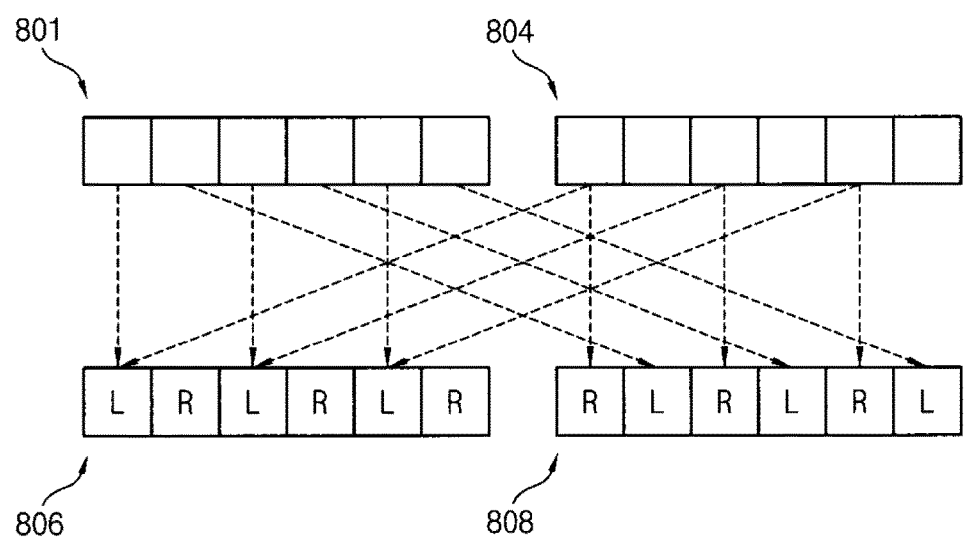
FIGS. 8A to 8D illustrate operation of a display system having a field sequential LC parallax barrier for use with the method of the embodiments.

In an alternate method, there is no need for filtering the image data as described above to eliminate the resolution differences. This embodiment is based on the method described in the paper "Field Sequential LC Barrier for a Full Resolution Auto-stereoscopic 3D Display" presented at SID 2011 by Samsung Electronics engineers, K. Kang et al. In the paper, a spatial phase switching liquid crystal parallax barrier is described that rapidly switches between two views of the autostereoscopically reduced resolution 3D images. The two images are time integrated by the human vision system to be full resolution. FIGS. 8A to 8D illustrates operation of a display system having such a field sequential LC barrier with the 3D display methods of the present disclosure. Instead of a single interleaved image of the left residual image and the right residual image, two interleaved images are made as shown in FIG. 8A. In FIG. 8A, the left residual image 801 and the right residual image 804 are interleaved as shown into what is referred to as an "odd" interleaved image 806 and an "even" interleaved image 808. In the interleaved images of FIG. 8A (as well as FIGS. 8B and 8C), the "L" represents a portion of the left residual image and the "R" represents a portion of the right residual image. The odd interleaved image, which has the first portion of the left residual image in the first position of the interleaved image, is the alternate of the even interleaved image, which has the first portion of the right residual image in the first position of the interleaved image.

Figure 8B:
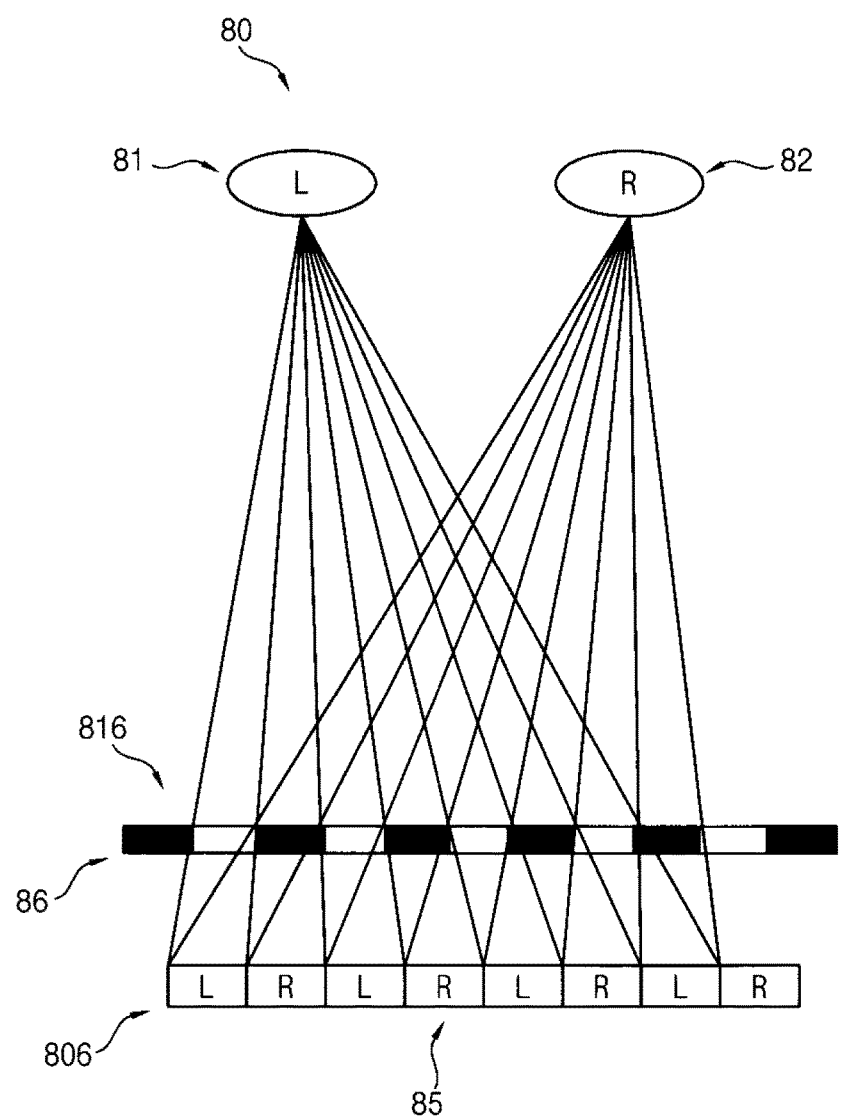
Figure 8C:
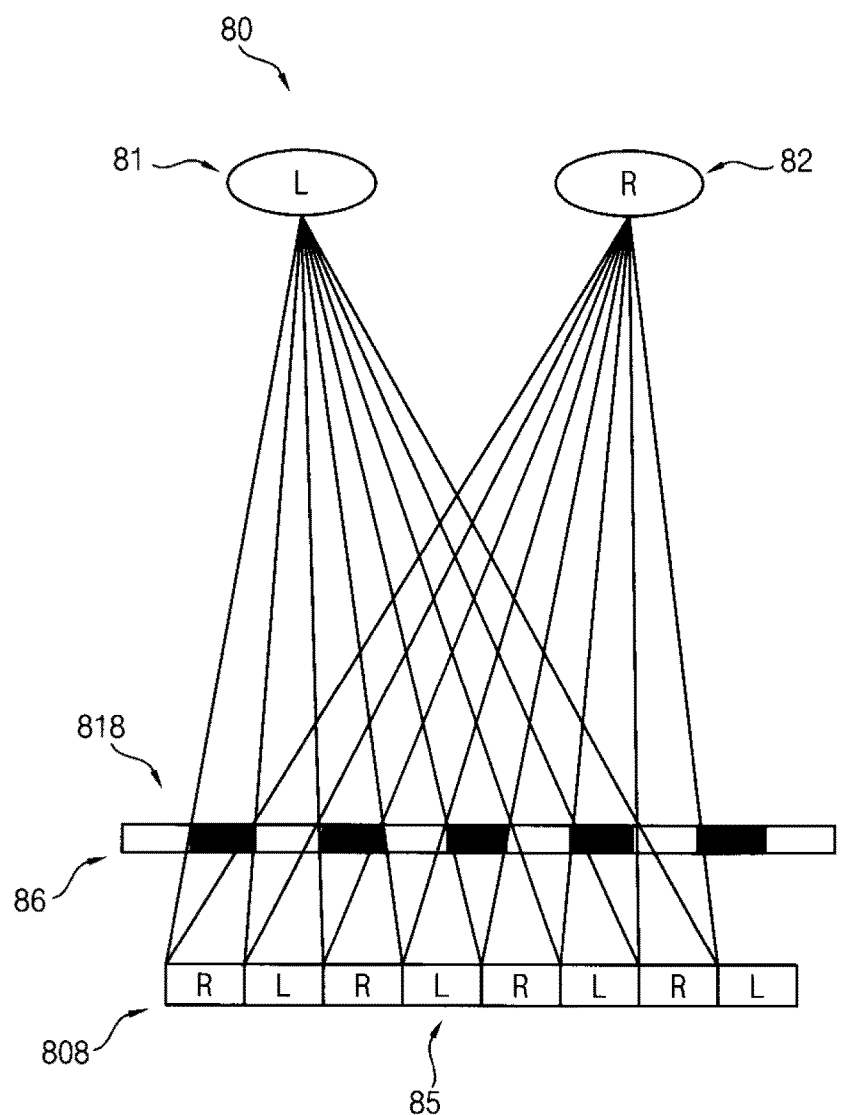
Figure 8D:
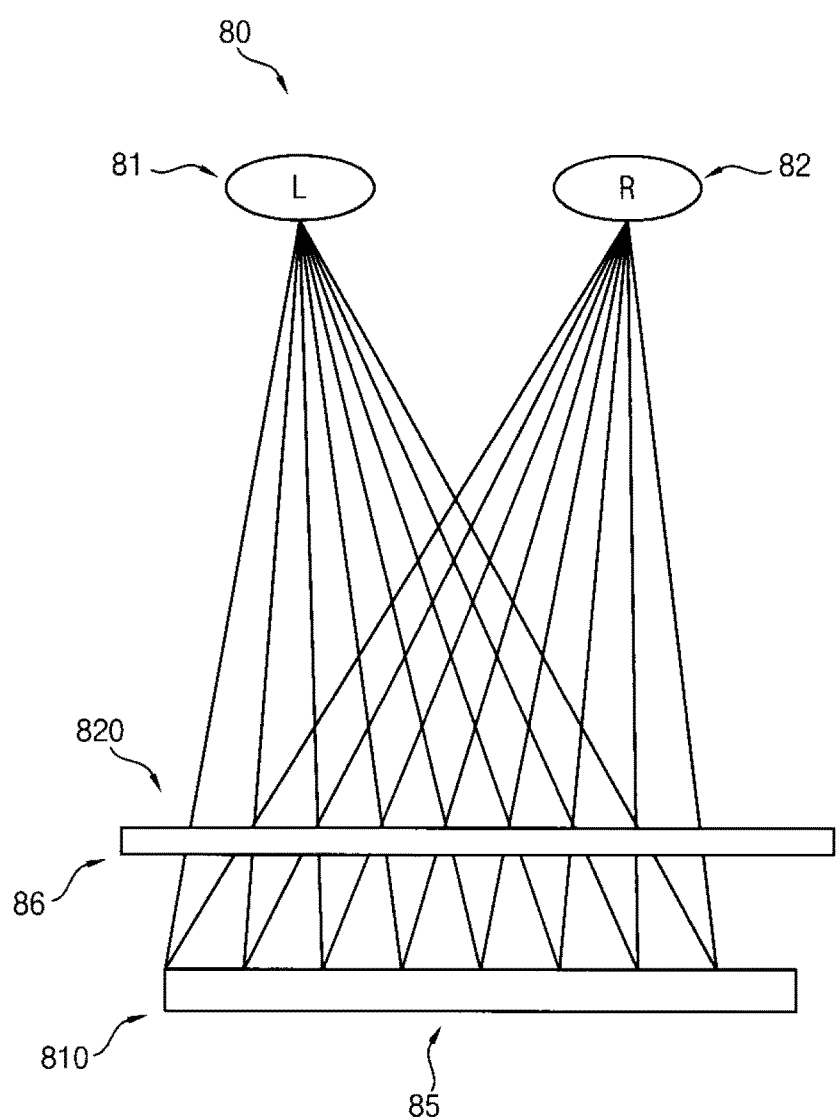

FIGS. 8B to 8D illustrate the display panel 85 and parallax barrier 86 of a display system 80 for displaying the 3D image using the odd and even interleaved images. Not shown in FIGS. 8B to 8D is the data processing module, which, similar to the previous display systems described herein, converts input image data having the 2 offset images into the common, left residual and right residual images. The data processing module of display system 80 also creates the odd interleave image 806 and the even interleaved image 808 from the left and right residual images, and controls the state of the parallax barrier 86, which is synchronized with the image being displayed.

FIGS. 8B to 8D show the image being displayed on display panel 85, the corresponding state of the parallax barrier 86, and the views of the left eye 81 and the right eye 82 of a viewer. FIG. 8B shows the case where the odd interleaved image 806 is displayed and the parallax barrier is adjusted to an "odd" state 816. FIG. 8C shows the case where the even interleaved image 808 is displayed and the parallax barrier is adjusted to an "even" state 818. FIG. 8D shows the case where the common image 810 is displayed and the parallax barrier is adjusted to the "off" state so that there is no parallax barrier and a 2D image is displayed. These images and corresponding parallax barrier states are sequentially shown in one of the various sequences discussed herein. Because of the fast switching between the even and odd states of the interleaved residual images and parallax barrier states, all of the data can be displayed without any loss of resolution. Because of the fast switching, typically 48 Hz or more, the viewer integrates the three views—common-odd interleaved residual images-even interleaved residual images—into a single 3D view.

Directional Backlight Display Systems

In an example embodiment, a directional backlight display system may be used as an autostereoscopic display system for use with the 3D display methods disclosed herein. In directional backlight systems, the backlight is used to direct an image to one or the other of a viewer's eyes. Thus, the left residual image can be directed to the left eye, the right residual image can be directed to the right eye, and, if the directional backlight display system can switch between 3D and 2D mode, the common image can be directed to both eyes.

Figure 9:
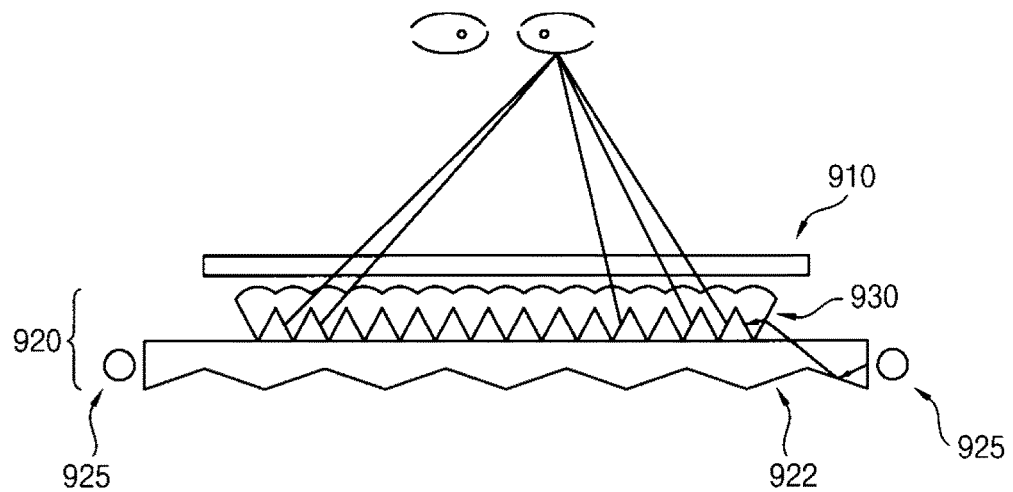
FIG. 9 illustrates a display system having a directional backlight system for use with the methods of the embodiments.

A directional backlight system is illustrated in FIG. 9. The directional backlight system 90 includes a display panel 910, typically a liquid crystal display panel, and a backlight 920. The backlight 920 includes a light guide plate 922, a left and right light source, 924 and 925, and a beam steering prism 930. The left and right light sources 924 and 925 may be, for example, a string of LED's. Such a display system may be, for example, the display as described in U.S. Pat. No. 8,068,187 "Stereoscopic 3D Liquid Crystal Display Apparatus having a Double Sided Prism Film Comprising Cylindrical Lenses and Non-contiguous Prisms" incorporated herein by reference in its entirety.

In operation, when a 2D image is to be displayed on display system 90, both of the left and right light sources 924 and 925 are turned on. When the right eye image is to be displayed, only the right light source 924 is turned on. As shown in FIG. 9, the light leaving the right light source 925 is reflected by the light guide plate 922 toward just one side of the beam steering prism 930, which then reflects the light through the display panel 910 toward just the right eye. When the left eye image is to be displayed, the left light source 924 is turned on and the right eye source 925 is turned off. Thus, switching between 2D, right 3D and left 3D is achieved by controlling the light sources.

To use such a directional backlight system with the display method disclosed herein, the display of the common image and the left and right residual images is synchronized with the state of the light sources. A data processing module (not shown) operates as previously described to convert input data of the offset images (left eye image and right eye image) to the common, left residual and right residual images. The data processing module then also signals the light sources 924 and 925 on the backlight 920 so that both are on when the common image is displayed, the left light source 924 is on and the right light source 925 is off when the left residual image is displayed, and the left light source 924 is off and the right light source 925 is on when the right residual image is displayed. Various display sequences as previously described may be used, for example, C-RR-LR, or C-RR-C-LR, etc.

Because both light sources 924 and 925 are on when the 2D display mode is used to display the common image, flicker may be perceived by a viewer unless the light is controlled to accommodate the change. For instance, when the light sources are LED strings, by only lighting a portion of the LEDs in each LED string when in 2D mode.

While various example embodiments have been described herein, it is to be understood that the invention is not limited to the disclosed embodiments, but, on the contrary, is intended to cover various modifications and equivalent arrangements included within the spirit and scope of the disclosure, including the appended claims.

The invention claimed is:

1. A method for displaying an image in three dimensions on a display system comprising:
    receiving into the display system right eye image data and left eye image data for each pixel of the image;
    calculating a common image from the right eye image data and left eye image data, the common image including image information that is common to both the right eye image and the left eye image;
    calculating a left residual image from the common image and the left eye image data, the left residual image including image information from the left eye image data that creates depth perception;
    calculating a right residual image from the common image and the right eye image data, the right residual image including image information from the right eye image data that creates depth perception; and
    sequentially displaying the common image, the right residual image and the left residual image on the display system in a predetermined sequence.

2. The method of claim 1, wherein calculating the common image from the right eye image data and the left eye image data comprises, for each pixel, determining a minimum value between the right eye image data and the left eye image data.

3. The method of claim 1, wherein calculating the left residual image comprises, for each pixel, subtracting the left eye image data from the common image.

4. The method of claim 1, wherein calculating the right residual image comprises, for each pixel, subtracting the right eye image data from the common image.

5. The method of claim 1, wherein the predetermined sequence is the common image, followed by the right residual image, followed by the common image, followed by the left residual image.

6. The method of claim 1, wherein the display system comprises a display panel connected to a data processing module, the right eye image data and left eye image data is received into the data processing module, the data processing module calculates the common image, the left residual image and the right residual image and the display panel displays the common image, the left eye image and the right eye image.

7. The method of claim 1, wherein the display system includes shutter glasses, the method further comprising:
    synchronizing a state of the shutter glasses with the predetermined sequence.

8. The method of claim 7, wherein the state of the shutter glasses allows both eyes of a viewer to see through the glasses when the common image is displayed, the state of the shutter glasses allows a left eye of a viewer, but not a right eye of the viewer, to see through the glasses when the left residual view is displayed, and the state of the shutter glasses allows a right eye of a viewer, but not a left eye of the viewer, to see through the glasses when the right residual image is displayed.

9. The method of claim 1, wherein the display system comprises a backlight including an array of individually controllable multi-color light emitters and a display panel that spatially modulates light from the backlight, wherein
    calculating the left residual image includes calculating a separate left residual image for each color of multi-color light emitters in the backlight;
    calculating the right residual image includes calculating a separate right residual image for each color of multi-color light emitters in the backlight; and
    the predetermined sequence includes displaying the common image with all colors in the backlight and alternately displaying the right residual image and left residual image for different colors in the backlight.

10. The method of claim 1, wherein the display panel includes a parallax barrier, the method further comprising:
creating an interleaved image by interleaving the left residual image and right residual image; and
synchronizing a state of the parallax barrier with the predetermined sequence,
wherein the predetermined sequence includes displaying the left residual image and right residual image as the interleaved image.

11. The method of claim 10, wherein the state of the parallax barrier is off when the common image is displayed and the state of the parallax barrier is on when the interleaved image is displayed.

12. The method of claim 10 further comprising applying a prefilter to the left eye image data and right eye image data to reduce a resolution difference between the common image and the interleaved image.

13. The method of claim 1, wherein the display panel includes a parallax barrier, the method further comprising:
calculating an odd interleaved image by interleaving the left residual image and right residual image with a first portion of the left residual image in a first position of the odd interleaved image;
calculating an even interleaved image by interleaving the left residual image and right residual image with a first portion of the right residual image in a first position of the even interleaved image; and
synchronizing a state of the parallax barrier with the predetermined sequence,
wherein the predetermined sequence includes displaying the left residual image and right residual image as the odd interleaved image and the even interleaved image.

14. The method of claim 1, wherein the display system includes a display panel and a directional backlight, the method further comprising:
synchronizing a direction the directional backlight directs light through the display panel with the predetermined sequence, wherein the backlight directs light to both eyes of a viewer when the common image is displayed, the backlight directs light to a left eye of the viewer when the left residual image is displayed, and the backlight directs light to a right eye of the viewer when the right residual image is displayed.

15. A method for displaying an image in three dimensions on a display system, the display system including a display panel for displaying the image connected to a data processing module, the method comprising:
receiving input image data into the data processing module, the input image data including left eye image data and right eye image data offset for producing a three dimensional image;
calculating a common image by determining, between the left eye image data and right eye image data, a minimum value for each pixel;
calculating a left residual image by subtracting the left eye image data from the common image;
calculating a right residual image by subtracting the right eye image data from the common image; and
transmitting the common image, left residual image, and right residual image to the display panel for display in a predetermined sequence, the predetermined sequence displayed at a high enough frequency for a viewer to perceive the three dimensional image.

16. The method of claim 15, wherein the predetermined sequence comprises the common image, followed by the left residual image, followed by the right residual image, followed by the common image, followed by the right residual image, followed by the left residual image.

17. The method of claim 15, wherein the predetermined sequence comprises the common image, followed by the left residual image, followed by the common image, followed by the right residual image.

18. The method of claim 15, wherein the display system further comprises a backlight, the method further comprising:
modulating the amount of light produced by the backlight in coordination with the predetermined sequence so that flicker between the common image and the left and right residual images is not perceived by a viewer.

19. The method of claim 15, wherein the display system further comprises shutter glasses, the method further comprising:
synchronizing a state of the shutter glasses with the predetermined sequence.

20. The method of claim 15, wherein the display system further comprises a parallax barrier, the method further comprising:
creating an interleaved image from the left residual image and right residual image; and
synchronizing a state of the parallax barrier with the predetermined sequence,
wherein the predetermined sequence includes displaying the common image and the interleaved image.

21. The method of claim 15, wherein the display system further comprises a directional backlight, the method further comprising;
synchronizing a direction the directional backlight directs light with the predetermined sequence, wherein the directional backlight directs light to both eyes of a viewer when the common image is display, directs light to a left eye of a viewer when the left residual image is displayed, and directs light to a right eye of a viewer when the right residual image is displayed.

* * * * *